US006776515B2

United States Patent
Schmitt

(10) Patent No.: US 6,776,515 B2
(45) Date of Patent: Aug. 17, 2004

(54) BULB SHIELD

(75) Inventor: Karl R. Schmitt, Rockford, IL (US)

(73) Assignee: Elco Textron Inc., Rockford, IL (US)

( * ) Notice: Subject to any disclaimer, the term of this patent is extended or adjusted under 35 U.S.C. 154(b) by 0 days.

(21) Appl. No.: 10/261,753

(22) Filed: Oct. 1, 2002

(65) Prior Publication Data

US 2003/0067785 A1 Apr. 10, 2003

Related U.S. Application Data

(60) Provisional application No. 60/328,037, filed on Oct. 5, 2001.

(51) Int. Cl.[7] .................................................. B60Q 1/00

(52) U.S. Cl. ....................... 362/539; 362/509; 29/527.2

(58) Field of Search ................................ 362/351, 509, 362/538, 539; 29/527.2; 313/113

(56) References Cited

U.S. PATENT DOCUMENTS

| | | | | |
|---|---|---|---|---|
| 5,497,298 A | | 3/1996 | Luallin et al. | |
| 5,497,299 A | | 3/1996 | Wisler et al. | |
| 5,850,124 A | | 12/1998 | Hasegawa et al. | |
| 5,962,973 A | | 10/1999 | Rice | |
| 6,010,236 A | | 1/2000 | Lai | |
| 6,012,830 A | * | 1/2000 | Fraizer | 362/539 |
| 6,079,860 A | | 6/2000 | Ito | 362/509 |
| 6,267,488 B1 | * | 7/2001 | Muegge et al. | 362/509 |
| 6,280,071 B1 | | 8/2001 | Yamamoto et al. | |
| 6,375,341 B1 | * | 4/2002 | Denley | 362/539 |
| 6,422,729 B1 | * | 7/2002 | Rohrbach et al. | 362/539 |
| 6,430,799 B1 | * | 8/2002 | Ballard et al. | 29/413 |
| 6,450,670 B1 | * | 9/2002 | Strauss et al. | 362/539 |

* cited by examiner

*Primary Examiner*—Y. My Quach-Lee
*Assistant Examiner*—Peggy A. Neils
(74) *Attorney, Agent, or Firm*—Trexler, Bushnell, Giangiorgi, Blackstone & Marr, Ltd.

(57) ABSTRACT

A bulb shield for use in an automotive headlamp assembly, and a method for making same. The bulb shield includes a cup portion and a portion which extends from the cup portion and is configured for mounting to a reflector of the automotive headlamp assembly or to another, proximate structure. When the bulb shield is mounted, the cup portion is generally horizontally aligned with a headlamp bulb in the automotive headlamp assembly, thereby eliminating a "hot spot" which would otherwise be viewable when looking into the headlamp beam. The bulb shield includes a part made of a glass and polymer blend, and at least a portion of the part includes a vacuum aluminized coating. Such a bulb shield is relatively inexpensive and easy to make, yet can withstand the high temperatures which are typically experienced in an automotive headlamp assembly. Additionally, the bulb shield may include a complex cup shape.

4 Claims, 4 Drawing Sheets

BULB SHIELD

RELATED APPLICATION (PRIORITY CLAIM)

This application claims the benefit of U.S. Provisional Application Serial No. 60/328,037, filed Oct. 5, 2001.

BACKGROUND OF THE INVENTION

The present invention relates generally to bulb shields for use in automotive headlamp assemblies, and relates more specifically to a bulb shield which includes a part which is formed of a glass and polymer blend and is coated with a metal, such as a vacuum aluminized metal coating.

The present invention also relates generally to methods of making bulb shields which are employed in automotive headlamp assemblies, and relates more specifically to a method of making a bulb shield where the method includes a step of injection molding a part using a glass and polymer blend and then coating at least a portion of the part with metal, such as in a vacuum aluminizing process.

Automotive headlamp assemblies generally include a headlamp bulb which is positioned in a reflector. A bulb shield is mounted to the reflector, and is positioned generally in front of the headlamp bulb. While the reflector functions to reflect the light from the headlamp bulb forward, thus forming a headlamp beam, the bulb shield functions to prevent an oncoming driver from seeing a “hot spot” in the headlamp beam.

Bulb shields typically include a cup portion which is disposed generally in front of the headlamp bulb, and portion which extends from the cup portion and mounts to the reflector or some other proximate structure. The cup portion of the bulb shield is usually relatively sharply concave, thereby providing that the light which enters the cup portion is reflected generally back to the headlamp beam.

Fabricating a bulb shield out of metal, such as out of a thin gauge steel, is difficult because of the peripheral edge of the cup portion having to meet precision requirements. Because the deep draw of the cup portion stretches the material somewhat randomly, trimming the peripheral edge of the cup portion is costly. Fabricating a bulb shield out of metal effectively provides that complex cup shapes are not possible, or at least are not economically feasible.

Instead of metal, it would be beneficial to provide a bulb shield which is at least partly formed of plastic. Plastic is not only lightweight and relatively inexpensive, but would provide that a bulb shield can be made within a plastic injection molding process, and that complex cup shapes can be formed. However, the cup portion of a bulb shield typically experiences extremely high temperatures, and most plastics which have a reasonable cost cannot endure such high temperatures. Specifically, the cup portion of a bulb shield often experiences temperatures as high as, or even higher than, 500° Fahrenheit (260° Celsius). Because low cost plastics cannot generally withstand such high temperatures, it has not been possible to provide a low cost, plastic bulb shield for use in an automotive headlamp assembly.

OBJECTS AND SUMMARY

Accordingly, it is an object of an embodiment of the present invention to provide a low cost bulb shield for use in an automotive headlamp assembly.

Another object of an embodiment of the present invention is to provide a bulb shield which has a relatively complex cup shape.

Still another object of an embodiment of the present invention is to provide a method of making a bulb shield for use in an automotive headlamp assembly, where the method includes injection molding a part and coating at least a portion of the part with metal.

Briefly, and in accordance with one or more of the foregoing objects, an embodiment of the present invention provides a bulb shield for use in an automotive headlamp assembly, and a method for making same. The bulb shield includes a cup portion and a portion which extends from the cup portion and is configured for mounting to a reflector of the automotive headlamp assembly or to another, proximate structure. When the bulb shield is mounted, the cup portion is preferably generally horizontally aligned with a headlamp bulb in the automotive headlamp assembly, thereby eliminating a “hot spot” which would otherwise be viewable when looking into the headlamp beam.

Preferably, the bulb shield includes a part made of a glass and polymer blend, and at least a portion of the part, such as a cup portion of the part, includes a vacuum aluminized coating. Such a bulb shield is relatively inexpensive and easy to make, yet can withstand the high temperatures which are typically experienced in an automotive headlamp assembly. Additionally, such a bulb shield may include a relatively complex cup shape.

Another embodiment of the present invention provides a method of making a bulb shield wherein the method includes injection molding a part made of a glass and polymer blend, and coating at least a portion of the part using a vacuum aluminizing process.

BRIEF DESCRIPTION OF THE DRAWINGS

The organization and manner of the structure and function of the invention, together with further objects and advantages thereof, may be understood by reference to the following description taken in connection with the accompanying drawings, wherein.

DESCRIPTION

Figure 1:
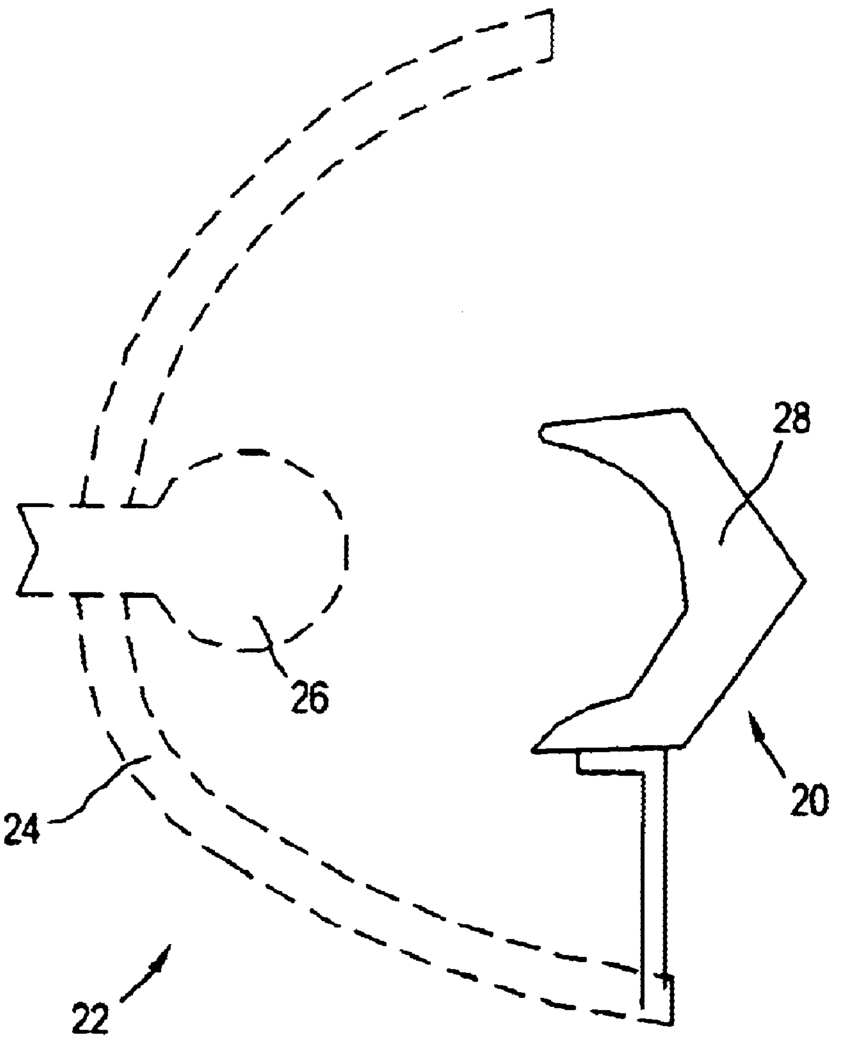
FIG. 1 is a simplified, schematic view of a portion of an automotive headlamp assembly, showing a reflector, a headlamp bulb and a bulb shield, wherein the bulb shield is shown bottom-mounted in the assembly.

While the present invention may be susceptible to embodiment in different forms, there is shown in the drawings, and herein will be described in detail, an embodiment of the invention with the understanding that the present description is to be considered an exemplification of the principles of the invention and is not intended to limit the invention to that as illustrated and described herein.

A bulb shield 20 which is in accordance with one embodiment of the present invention is illustrated in FIGS. 2–6. The bulb shield 20 is generally lightweight, inexpensive and easy to make. In addition, the bulb shield 20 can withstand the high temperatures which are typically experienced in an automotive headlamp assembly, and is designed such that it can include a cup shape which is relatively complex.

Figure 1A:
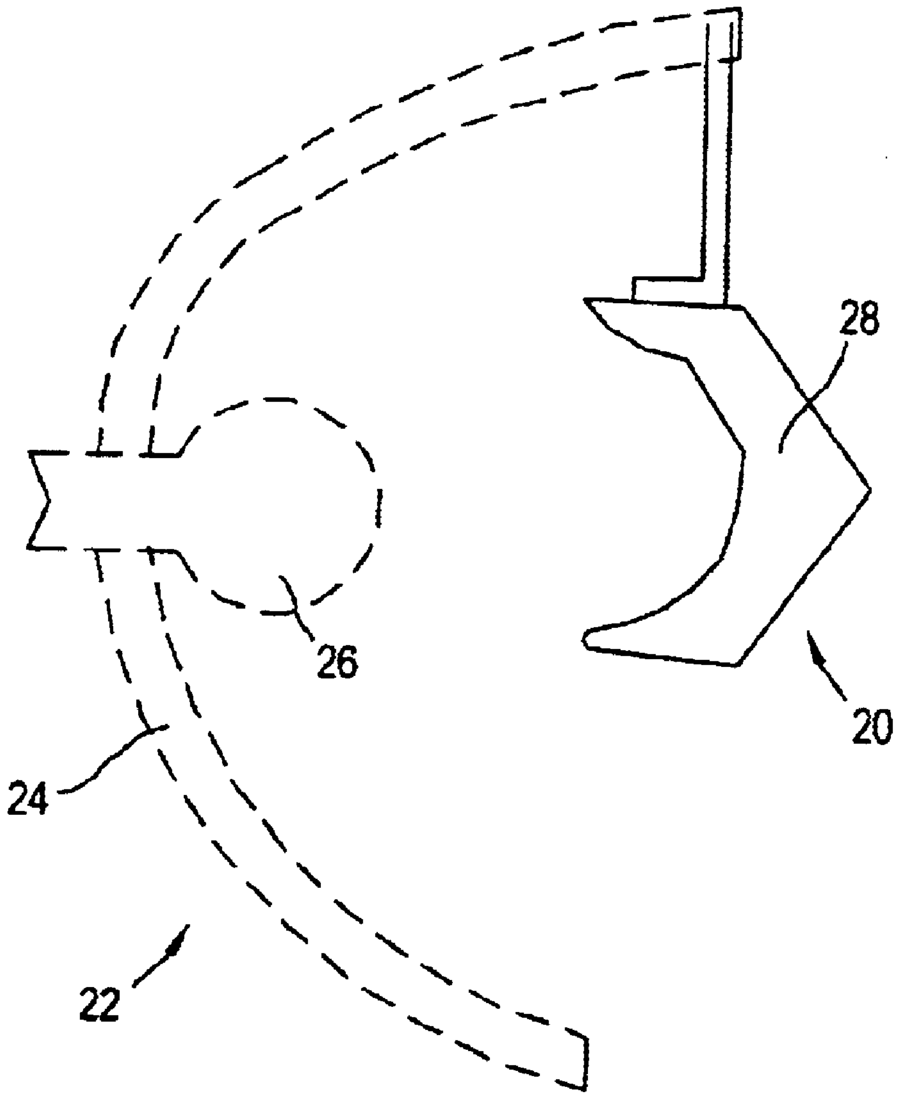
FIG. 1A is a view similar to that of FIG. 1, but showing the bulb shield top-mounted in the assembly.
Figure 2:
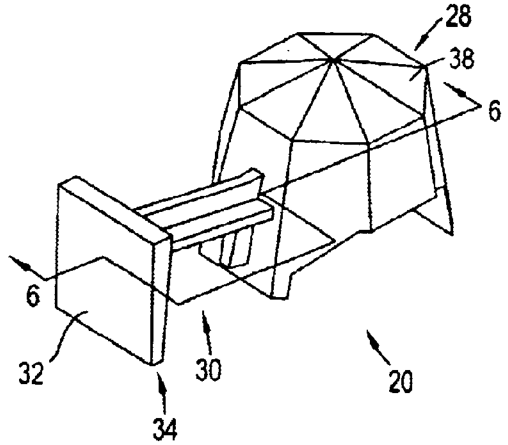
FIG. 2 is a front, perspective view of a bulb shield which is in accordance with one embodiment of the present invention.
Figure 3:
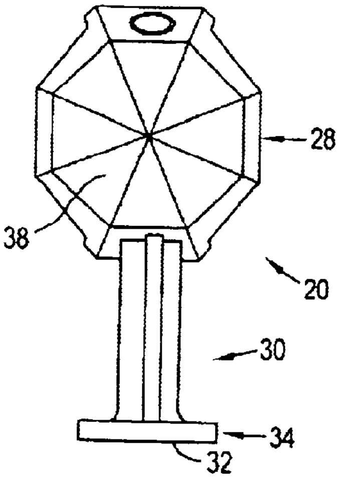
FIG. 3 is a front, elevational view of the bulb shield illustrated in FIG. 2.
Figure 4:
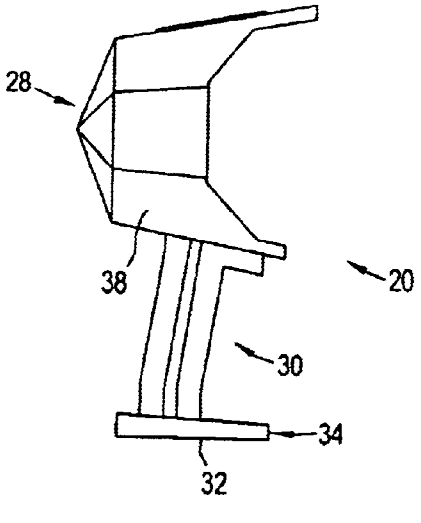
FIG. 4 is a side, elevational view of the bulb shield illustrated in FIG. 2.
Figure 5:
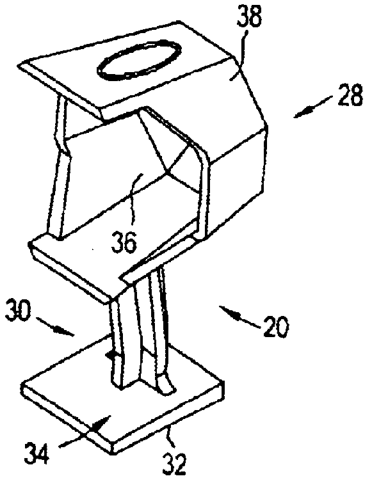
FIG. 5 is a rear, perspective view of the bulb shield illustrated in FIG. 2.
Figure 6:
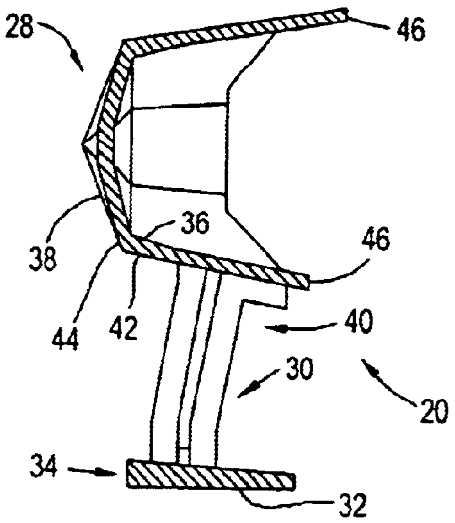
FIG. 6 is a side, cross-sectional view of the bulb shield illustrated in FIG. 2, taken along line 6—6 of FIG. 2.

FIGS. 1 and 1A depict how the bulb shield 20 is envisioned to be incorporated into an automotive headlamp assembly 22. As shown, the headlamp assembly 22 includes a reflector 24 and a headlamp bulb 26 disposed in the reflector 24. The bulb shield 20 is mounted to the reflector 24. While FIG. 1 shows the bulb shield 20 bottom-mounted in the assembly 22, FIG. 1A shows the bulb shield 20 top-mounted in the assembly. Regardless of whether the bulb shield 20 is bottom-mounted or top-mounted, preferably the bulb shield 20 is mounted to the reflector 24 or some other proximate structure such that a cup portion 28 of the bulb shield 20 is generally horizontally aligned with the headlamp bulb 26. Such alignment between the headlamp bulb 26 and the cup portion 28 of the bulb shield 20 causes the cup portion 28 to block or eliminate the "hot spot" which would otherwise be viewable by, for example, an oncoming driver who looks in the direction of the projected headlamp beam.

As shown in FIGS. 2–6, the bulb shield 20 includes a cup portion 28 and a stem portion 30 which extends from the cup portion 28. Preferably, it is the end 32 of the stem portion 30 which is configured for mounting the bulb shield 20. Specifically, as shown, the end 32 of the stem portion 30 may include a base 34 which is receivable in a corresponding channel, where the channel is provided either on the reflector or on another, proximate structure for mounting the bulb shield 20. Preferably, the stem portion 30 is of a length which provides that when the bulb shield 20 is mounted, the bulb shield 20 is generally aligned with the headlamp bulb 26 (see FIGS. 1 and 1A) such that the bulb shield 20 eliminates the "hot spot" which would otherwise be caused by the headlamp bulb 26.

Preferably, the cup portion 28 of the bulb shield 20 is sharply concave having an inside surface 36 and an outside surface 38, wherein the inside surface 36 generally faces the headlamp bulb 26 when the bulb shield 20 is correctly mounted. Alternatively, the cup portion 28 may take some other shape. The cup portion 28 may have a relatively complex shape. Regardless of the shape of this portion of the bulb shield 20, preferably the portion 28 is configured to block or eliminate the headlamp beam "hot spot" when the bulb shield 20 is correctly mounted.

Preferably, the bulb shield 20 is configured such that it includes a main body portion 40 which is formed of a glass and polymer alloy or blend such as Cortem®, presently commercially available from Coming Incorporated (One Riverfront Plaza, Corning, N.Y. 14831). The main body portion 40 may be formed via an injection molding process. The fact that the main body portion 40 is made of a glass and polymer alloy or blend such as Cortem® provides that the cup portion 28 can withstand the high temperatures which are experienced by the bulb shield 20 when the bulb shield 20 is employed in an automotive headlamp assembly 22, as shown in FIGS. 1 and 1A. Additionally, the fact that the main body portion 40 is injection molded provides that the cup portion 28 can have a relatively complex shape and is easy to make.

Preferably, at least the outside surface 42 of the main body portion 40 has a vacuum aluminized metal coating 44 thereon. Specifically, metal, such as aluminum, is applied to the outside surface 42 of the main body portion 40 in a vacuum aluminizing process. Such a coating 44 provides that the bulb shield 20, and specifically the outside surface 38 of the cup portion 28 thereof, has an attractive appearance.

The vacuum aluminizing process provides that the main body portion 40 and the vacuum aluminized coating 44, which have different thermal coefficients of expansion, can grow separately, but still remain attached and assembled when subjected to heat. The injection molding and vacuum aluminizing process also provides that the peripheral surface 46 of the cup portion 28 is shaped and sized to meet precision requirements, and may have a relatively complex edge.

Figure 7:
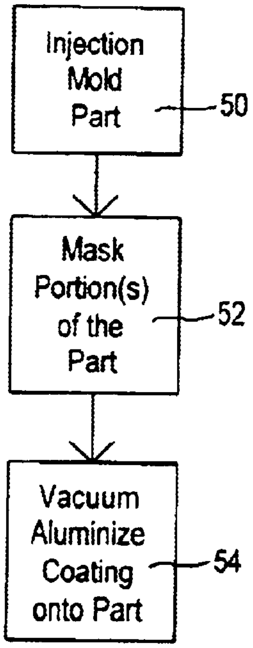
FIG. 7 is a block diagram of a method which can be employed to make the bulb shield shown in FIGS. 2–6.

A method which can be used to make the bulb shield 20 shown in FIGS. 2–6 will now be described with reference to FIG. 7. First, the main body portion 40 is injection molded (box 50 in FIG. 7) using a glass and polymer alloy or blend such as Cortem®. Specifically, preferably a plurality of identical parts are molded simultaneously using a multiple cavity tool. Each part preferably provides the stem portion 30 and the inside surface 36 of the cup portion 28, as shown in FIGS. 2–6. Then, preferably, the inside surface 36 of the cup portion 28 is masked (box 52 in FIG. 7) from vacuum aluminizing. After the appropriate areas have been masked, a metal, such as aluminum is vacuum aluminized (box 54 in FIG. 7) onto the outside surface 42 of the main body portion 40 of the bulb shield 20. Overall, such a process is simple and easy to perform. Additionally, such a process yields a bulb shield 20 which has desired properties, such as being lightweight and relatively inexpensive, yet meets precision requirements at the peripheral edge 46. Furthermore, such a process provides that the bulb shield 20 can have a relatively complex cup shape.

While an embodiment of the present invention is shown and described, it is envisioned that those skilled in the art may devise various modifications without departing from the spirit and scope of the foregoing description.

What is claimed is:

1. A method of making a bulb shield for use in an automotive headlamp assembly, said bulb shield including a cup portion and a portion which extends from the cup portion and is configured for mounting wherein when the bulb shield is mounted, the cup portion is generally horizontally aligned with a headlamp bulb in the automotive headlamp assembly, said method comprising: injection molding a main body portion; and vacuum aluminizing a coating onto the main body portion.

2. A method as recited in claim 1, wherein the step of vacuum aluminizing a coating onto the main body portion comprising vacuum aluminizing aluminum onto the main body portion.

3. A method as recited in claim 1, further comprising masking at least a portion of the cup portion of bulb shield before vacuum aluminizing.

4. A method as recited in claim 3, wherein the step of masking at least a portion of the cup portion of the bulb shield before vacuum aluminizing comprises masking at least a portion of an inside surface of the cup portion of the bulb shield.

* * * * *